United States Patent [19]
Chowdhury et al.

[11] Patent Number: 5,910,366
[45] Date of Patent: Jun. 8, 1999

[54] THIN FILM COMPOSITE MEMBRANE AS BATTERY SEPARATOR

[75] Inventors: Geeta Chowdhury, Ottawa; William Adams, Nepean; Brian Conway; Srinivasa Sourirajan, both of Ottawa, all of Canada

[73] Assignee: The University of Ottawa, Ottawa, Canada

[21] Appl. No.: 09/041,037

[22] Filed: Mar. 12, 1998

Related U.S. Application Data

[62] Division of application No. 08/754,741, Nov. 21, 1996, Pat. No. 5,798,180, which is a continuation of application No. 08/297,875, Aug. 30, 1994, abandoned.

[30] Foreign Application Priority Data

Jun. 14, 1994 [CA] Canada ................................. 2125840

[51] Int. Cl.$^6$ ............................. B32B 9/04; B32B 23/04
[52] U.S. Cl. .................. 428/379; 428/411.1; 428/532; 204/418
[58] Field of Search ........................... 204/418; 428/379, 428/411.1, 532

[56] References Cited

U.S. PATENT DOCUMENTS 5,364,454  11/1994  Bikson et al. ........................ 95/45

OTHER PUBLICATIONS

"Rechargeable Cells with Modified $MnO_2$ Cathodes", Dzieciuch et al., Research Staff, Ford Motor Company, Dearborn, Michigan, J. Electrochem Soc. vol. 135, No. 10 (1988) 2415–2418.

"Development of Sulfonated Polysulfone Membranes for Redox Flow Batteries", Arnold, Jr. et al.—Sandia National Laboratories, Albuquerque, NM, Journal of Membrane Science 38 (1988) 71–83.

"Materials for the New Batteries", Jeffrey Braithwaite, Advanced Materials & Processes Incorporating Metal Progress, vol. 131, Issue 4, Apr. 1987.

"Preparation of Composite Membranes by a Spin Coating Process", J.D. LeRoux et al., Department of Chemical Engineering, Center for Polymer Research, The University of Texas at Austin, TX, Journal of Membrane Science, 74 (1992) 233–252.

Synthesis and Transport Properties of Thin Film Composite Membranes, Huang et al., Department of Chemical Engineering, University of Waterloo, Waterloo, Ontario, Canada, Journal of Applied Polymer Science, vol. 29, (1984) 4017–4027.

*Primary Examiner*—Kriellion S. Morgan
*Attorney, Agent, or Firm*—Oliff & Berridge, PLC

[57] ABSTRACT

The present invention relates to film composite membranes for use as battery separators or coatings on electrodes.

4 Claims, 5 Drawing Sheets

THIN FILM COMPOSITE MEMBRANE AS BATTERY SEPARATOR

This is a Division of application Ser. No. 08/754,741 filed Nov. 21, 1996 now U.S. Pat. No. 5,798,180, which in turn is a Continuation of application Ser. No. 08/297,875 filed Aug. 30, 1994 now abandoned. The entire disclosure of the prior application(s) is hereby incorporated by reference herein in its entirety.

BACKGROUND OF THE INVENTION

The rechargeability of battery systems, amongst other things, is affected by the presence of ionic species that interfere with the reversibility of reduction and oxidation processes within the electrochemical cell. For example, the rechargeability of manganese dioxide cathodes in battery cells with zinc as anode and KOH as electrolyte is affected by dissolved zincate species, where the zincate interferes with the reduction and oxidation processes involving manganese dioxide thereby reducing the cycle life of the battery. Zincate, formed at the anode, migrates through the separator to the cathode side of the battery where its known deleterious effect occurs. There has, therefore been a need for a separator or electrode coating material that selectively inhibits the passage of zincate ions to the cathode.

Past membrane separators have used microporous membranes which are not species selective thereby enabling the crossover of electroactive ions to take place which leads to self-discharge, reduced cycle life and loss of coulombic efficiency of the cathode.

There has, therefore, been a need for membrane material to be used as a separator or electrode coating material with properties that enable it to overcome the problems of a separator that is not species-selective. In addressing these problems, a separator or coating material should be ion-selective, that is, enables the free passage of certain ions between electrodes but inhibits the passage of others. In the manganese dioxide battery system, there is a need for a separator or coating material that enables the movement of hydroxide but inhibits the passage of zincate and other complex ionic species. Zincate is a relatively large negative ion compared to a negative ion such as hydroxide. The mechanism of exclusion may be by the Donnan exclusion method (surface charge) and/or by physical closure of a fraction of membrane pores. The membrane must, however, maintain a low resistivity to maintain battery efficiency and be ion-conductive at the pH of the system.

As well, there is a need for a membrane material that is inexpensive to make and is stable in the concentrated electrolyte of the battery system. In particular, there is a need for a polymer material soluble in common organic solvents, such as methanol, but which is not soluble in most battery electrolytes, such as potassium hydroxide. The polymer membrane must also be able to effectively bind an ion-selective coating.

Past battery separators have used materials such as Nafion™ (a sulphonated polytetrafluoroethylene) or fluorosulphonated teflon™. In addition to being expensive, these materials are unsuitable as ion selective separators for commercial battery systems. In particular, Nafion is primarily a protonic conductor, that is, more conductive in an acid environment. Furthermore, it has a low ion exchange capacity and is not readily bonded to a polymer backbone which makes it unsuitably fragile for use in a commercial battery system.

Other separator materials such as cellulose are unstable in strong alkaline electrolytes, such as 9 M KOH.

Earlier work by Dzieciuch et al (*J. Electrochem Soc.* 135 2415–2418 (1988)) showed that a serious loss of rechargeability resulted due to zincate ions diffusing to the manganese dioxide based cathode. Test results with Nafion, Daramic™ and Celgard™ separators illustrated that separators which impeded the transport of zincate enabled a large number of cycles to be attained with a significant amount of the two electron capacity remaining.

Arnold and Assink (Journal of Membrane Science, 38 (1988) 71–83) developed sulfonated polysulfones membranes for use in a flow battery. These membranes demonstrated appropriate stability, resistivity and selectivity for a flow battery.

SUMMARY OF THE INVENTION

In accordance with the invention there is provided an ion-selective membrane comprising:
  a polymer substrate membrane having a porosity, electrical resistance and
  wettability suitable for use as a battery separator;
  a polyaromatic ether of the formula

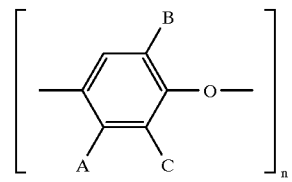

where A is selected from sulphonic acid or carboxylic acid groups and B and C are selected from lower alkyl and phenyl, said polyaromatic ether being coated on the polymer substrate membrane.

The polyaromatic ether may be provided with a degree of sulphonation or carboxylation providing a maximum ion-exchange capacity for a minimum resistance of the ion-selective membrane.

In a more specific embodiment, the polyaromatic ether may be sulphonated poly(2,6-dimethyl-1,4-phenylene oxide) (SPPO) and the substrate membrane may be Celgard™ 3559.

The ion-selective membrane preferably has a resistivity less than $1.2\Omega/cm^2$, a permeability to zincate ions of $0.045-0.103$ mg/cm$^2$h.

The substrate membrane may be a wettable cellulose-acetate coated polypropylene having a surface porosity of around 45%, an average thickness of 25±3 microns and pore dimensions around 0.075 by 0.25 microns.

In a specific embodiment, the invention provides an ion-selective membrane for use as a battery separator comprising:
  a Celgard™ 3559 separator membrane;
  sulphonated poly(2,6-dimethyl-1,4-phenylene oxide) (SPPO) being coated on the polymer substrate membrane, the degree of sulphonation of the SPPO providing an ion-exchange capacity of the ion-selective membrane of 1.5–1.9 meq/g.

The invention also provides a method of preparing an ion-selective membrane comprising the steps of:
  a) providing a polymer substrate membrane porosity, electrical resistance and wettability for use as a battery separator;
  b) coating a thin film of a polyaromatic ether of the formula:

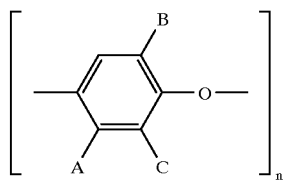

where A is selected from sulphonic acid or carboxylic acid groups and B and
C are selected from lower alkyl and phenyl on said polymer substrate
membrane to form a coated substrate; and
c) air drying the coated substrate.

The method also provides for the polyaromatic ether solution cast on one or both sides of the polymer substrate membrane and wherein the polyaromatic ether is dissolved in methanol (1 wt. %) prior to coating the polymer substrate membrane.

In a specific embodiment, the invention provides a method of preparing an ion-selective membrane comprising the steps of:

a) solution casting a Celgard™ 3559 membrane with sulphonated poly(2,6-dimethyl-1,4-phenylene oxide) (SPPO) dissolved in methanol (1 wt. %) to form a coated substrate; and b) air drying the coated substrate, the SPPO having a degree of sulphonation providing an ion-exchange capacity of the ion-selective membrane of 1.5–1.9 meq/g.

The invention is also directed to the use of poly(2,6-dimethyl-1,4-phenylene oxide) SPPO as a surface coating for an electrode in an alkaline battery system, a metal oxide battery system, including manganese dioxide and nickel oxide, a zinc/bromine, or a zinc/air battery system.

In a specific embodiment the invention is directed to an ion-selective electrode comprising:
an electrode; and,
a polyaromatic ether coated on the electrode.

The electrode may be manganese dioxide or nickel oxide.

The polyaromatic ether may be sulphonated poly(2,6-dimethyl-1,4-phenylene oxide)(SPPO).

In a specific embodiment, the invention is directed to an ion-selective membrane for use as a battery separator comprising:

wettable cellulose-acetate coated polypropylene substrate membrane, said substrate membrane having a porosity of 45%, an average thickness of 25±2.5 microns and pore dimensions around 0.075×0.25 microns;

sulphonated poly(2,6-dimethyl-1,4-phenylene oxide) solution cast on said substrate membrane, the level of sulphonation providing an ion-exchange capacity of 1.5–1.9 meq/g, a resistivity of $0.1–0.2\Omega/cm^2$ and a permeability to zincate ions of $0.045–0.103$ mg/cm$^2$h.

BRIEF DESCRIPTION OF THE DRAWINGS

These and other features of the invention will become more apparent from the following description in which reference is made to the appended drawings wherein.

DESCRIPTION OF PREFERRED EMBODIMENT

Figure 1:
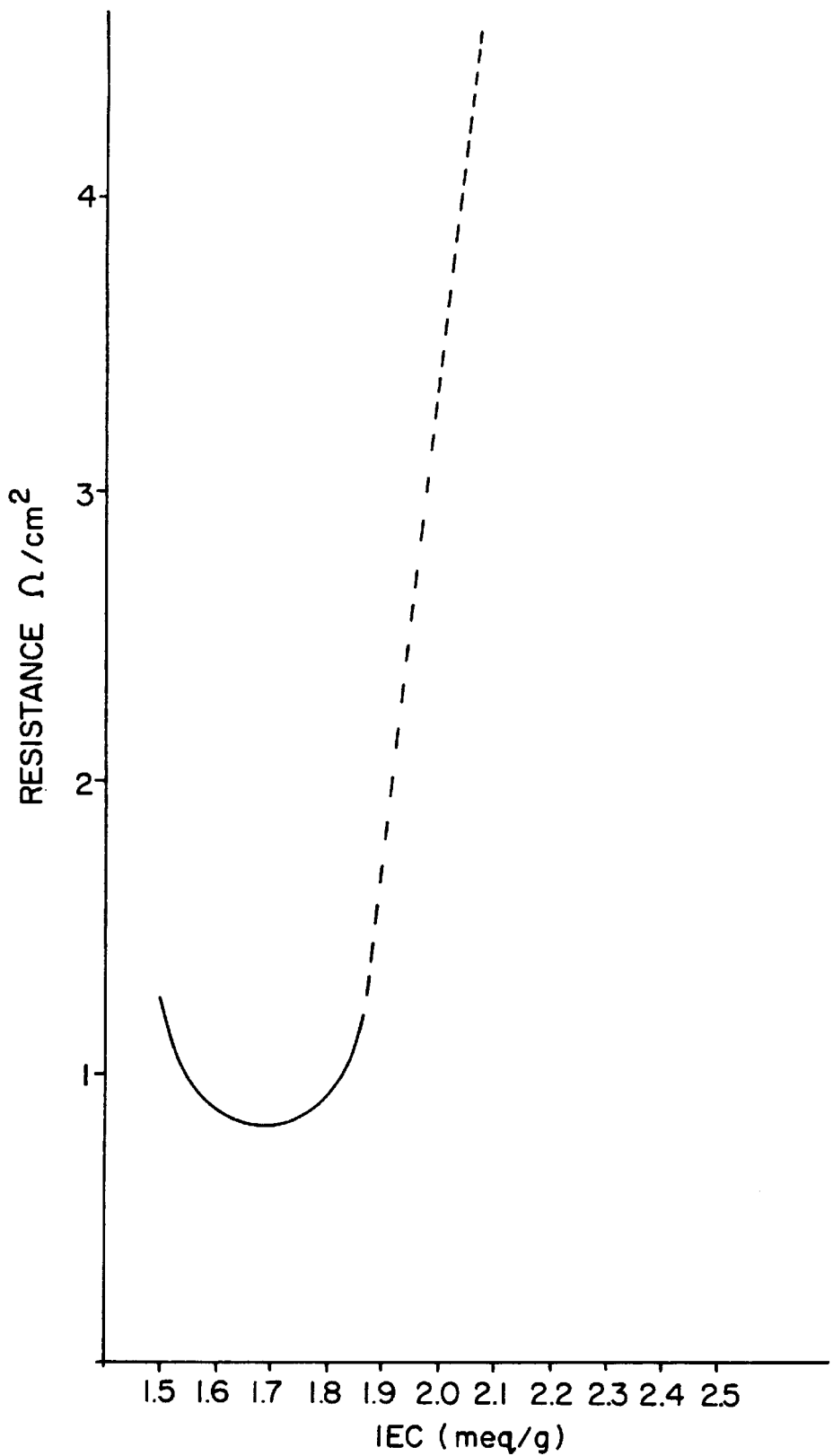
FIG. 1 shows the resistance of a Celgard membrane coated with SPPO as a function of ion exchange capacity of SPPO in 9M KOH.

In its broadest form, the invention is directed to an ion-selective membrane with a substrate membrane and an ion-selective coating coated on the substrate membrane. The invention is also directed to an ion-selective coating for electrodes.

Ion-selective separators are prepared by solution casting a polyaromatic ether on a polymer substrate membrane with an acceptable microporous structure and surface adhesion properties. It is understood that any polymer substrate membrane with a suitable microporous structure to enable ion diffusion and with surface properties which enable the polyaromatic ether to bind to the substrate membrane may be used. It is also understood that the invention may be used in a variety of battery systems. For example, the invention may be used in rechargeable battery systems such as zinc/manganese dioxide, metal hydride/manganese dioxide, nickel/iron and zinc/nickel oxide or zinc/bromine or zinc/air battery systems.

In a general form, the coating material may be polyaromatic ethers of the form:

$$\left[ \underset{A\ \ \ C}{\overset{B}{\bigcirc}} -O- \right]_n$$

where A is selected from sulphonic acid or carboxylic acid groups; and, B and C are selected from lower alkyl or phenyl.

In a specific form, the coating material is $$\left[ \underset{SO_3^-H^+\ \ \ CH_3}{\overset{CH_3}{\bigcirc}} -O- \right]_n$$

(SPPO).

The ion-selective separators are prepared by solution casting a dilute solution of the aromatic polyether on the membrane substrate. For example, Celgard separators (Hoescht Celanese Corp) were coated by contacting the separator with a dilute solution of SPPO (1 wt. % in methanol) and air drying for 24 hours. The separator was used in the hydrogen form.

Other membrane substrates included Scimat™ S450, Scimat 400, Celgard K869, Celgard 3401, Celgard 5550, Celgard D335, Celgard 2500, Celgard 3559 and Deramic.

A. Membrane Preparation

An ion-selective membrane is prepared by solution casting a suitable polyaromatic ether on a substrate membrane. For example, a thin film composite membrane with ion selective characteristics was prepared by surface coating Celgard 3559 (Hoechst Celanese Corporation) separator with a thin layer of sulfonated poly(2,6-dimethyl-1,4-phenylene oxide) (SPPO). Celgard 3559 is a cellulose acetate-coated polypropylene material developed for alkaline battery systems with a typical porosity of 45%, pore dimensions of 0.075×0.25 microns, an average thickness 25±2.5 microns, a maximum electrical resistance of 51 milliohm/sq cm., wettable in water and chemically stable in alkaline solutions.

SPPO is prepared by chemically reacting poly(2,6-dimethyl-1,4-phenylene oxide) (PPO) with chlorosulphonic acid in solution as described in R. Y. M. Huang, J. J. Kim, Journal of Applied Polymer Science, vol 29, 4017–4027 (1984). The degree of sulphonation is controlled in accordance with observed ion-exchange capacity and membrane resistance. For example, if the degree of sulphonation is low, the negative surface charge on the membrane may be too low to effectively repel zincate ions thereby allowing their diffusion across the membrane. Furthermore, if the level of sulphonation is too high, excess negative surface charge may, in addition to repelling zincate ions may further repel hydroxide ions thereby increasing the overall membrane resistance to unacceptable levels. Accordingly, a balance between ion-exchange capacity and membrane resistance is controlled by the degree of sulphonation of the polyaromatic ether.

A similar balance between ion-exchange capacity and membrane resistance is determined for other polyaromatic ethers, which may be carboxylated or sulphonated.

B. Performance Testing

Following preparation of coated membranes, performance tests were undertaken to determine the effectiveness of the coated membranes as a battery separator.

i) Ion Exchange Capacity

It is desirable for the coated membrane to have an ion exchange capacity with a corresponding low electrical resistance. Ion exchange capacity is a measure of the ability of the membrane to selectively permit the passage of certain ions through the membrane and is related to the resistance of the membrane.

FIG. 1 shows the resistance of a Celgard membrane coated one side with SPPO as a function of ion exchange capacity (IEC) in 9 M KOH. The resistance of the coated membrane decreases with increase of IEC up to IEC=1.7 and increases with IEC above IEC=1.7. Thus, the desirable range of IEC is typically between 1.5 and 1.9 meq/g for this membrane. The IEC may be controlled by the level of sulphonation of the SPPO.

ii) Resistance

The resistances of bare Celgard membranes (3559) and the SPPO coated membrane was measured and is shown in Table 1. The data indicate that the resistance of the coated membrane is slightly higher than that of the bare membrane but maintains an acceptable resistivity value for use as a battery separator.

TABLE 1

Cell Membrane Resistance

| Membrane | 3559 | coated 3559 |
|---|---|---|
| R ($\Omega/cm^2$) | 0.21 | 0.25 | membrane in 9 KOH iii) Zincate Permeabilty

Specifically, the ability of the membrane for restricting transport of zincate through the membrane has been improved by coating SPPO to the membrane (Table 2). The rate of zincate flux through the coated membrane is lower than that of zincate passing through the bare membrane. Measurements of zincate were made using a calibrated lead electrode.

TABLE 2

Cell Membrane Permeability for $ZnO_2^{2-}$ Transfer

| Membrane | 3559 | coated 3559-1 | coated 3559-2 |
|---|---|---|---|
| Rate (mg/cm² h) | 1.35 | 0.103 | 0.045 |

C. Examples i) Coated and Uncoated Membranes

Results of tests conducted on a number of different coated and uncoated membrane substrates are summarized in Table 3. Table 3 shows the effect of coating SPPO on a variety of different membrane substrates for its resistivity to zincate ions. To be suitable for a membrane separator, a low membrane resistance and high resistivity to zincate ions is desired. As can be seen from these series of experiments, Celgard 3559 coated with SPPO provides the lowest ohmic resistance with high resistivity to zincate. Resistivity was a qualitative estimate of zincate ions appearing on the cathode side of the cell, measured in hours until zincate ion could be detected on the opposite side of the membrane.

TABLE 3

| | Membrane ID | Coating polymer [wt %] | I.E.C [meq/g] | Resistance R ohm/cm*cm | Resistivity to zincate ions [hours] |
|---|---|---|---|---|---|
| 1 | Scimat S450/1 (cellophane-back) | — | 6.0 | 0.2 | 7–8 |
| 2 | Scimat S450/1 (unknown-back) | — | 60 | 90 | 7–8 |
| 3 | Scimat 400/1 (I) | — | 6.0 | 0.4–0.45 | 7–8 |
| 4 | Scimat 400/1 (II) | — | 6.0 | 0.12–0.13 | 7–8 |
| 5 | Celgard K869 | — | — | 126 | >2 days |
| 6 | K 869: coated-Nafion 117 | 5.0 | 0.8 | 65 | 25 |
| 7 | K 869: coated-SPPO | 10.0 | 2.4 | 6.3 | 24 |
| 8 | K 869: coated-SPPO | 5.0 | 1.3 | 6 | |
| 9 | Celgard 3401 | — | — | 0.3 | <1 |
| 10 | Celgard 3401: coated-SPPO | 10.0 | 2.0 | 0.3 | 3–4 |
| 11 | Celgard 5550 | — | — | 0.46 | <1 |
| 12 | Celgard 5550: coated-SPPO | 10.0 | 2.0 | 0.25 | 3–4 |
| 13 | Celgard D 335 | — | — | 0.1 | <1 |
| 14 | Celgard D 335: coated-SPPO | 10.0 | 2.0 | 0.1 | 3–4 |
| 15 | Celgard 3559 | — | — | 0.21 | <1 |
| 16 | Celgard 3559: coated SPPO | 1.0 | 1.7 | 0.1–0.2 | >7 days |
| 17 | Deramic | | | 0.1–0.2 | <1 |
| 18 | Deramic: coated-SPPO | 10.0 | 2.0 | 0.1 | <1 | ii) Membranes as Separators in a Battery System

The coated membranes were also incorporated into a battery system. Celgard-2500 and 3559 were used for separating zincate ion from a manganese dioxide cathode in order to examine the effect of a coated membrane on the rechargeability of a manganese dioxide cathode. Celgard 2500 was coated by SPPO on both sides. The potential of modified manganese dioxide cathode cycled at 0.4 A/g is shown as a function of discharge time and cycle number in FIG. 2. The capacity of the modified manganese dioxide cathode showed a decline of about 13% from the theoretical 2-electron capacity after 52 cycles.

Figure 3:
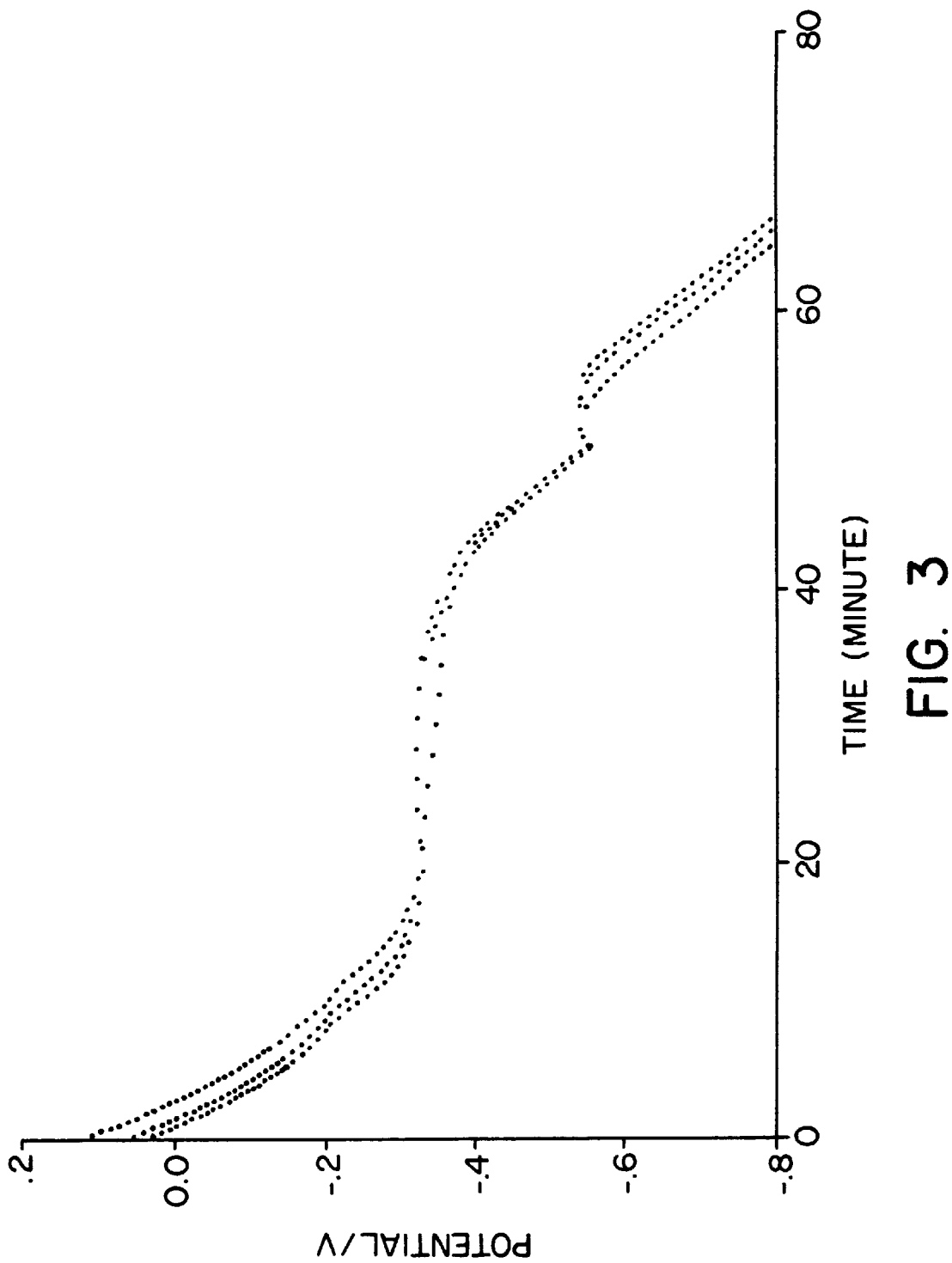
FIG. 3 shows discharge curves of a chemically modified manganese dioxide cathode in 9 M KOH with a Celgard membrane coated by SPPO.

FIG. 3 shows results of a cell with Celgard 3559 membrane coated with SPPO on only 1 side. The capacity of the modified manganese dioxide cathode showed a decline of about 12% from the theoretical 2-electron capacity after 50 cycles.

Figure 4:
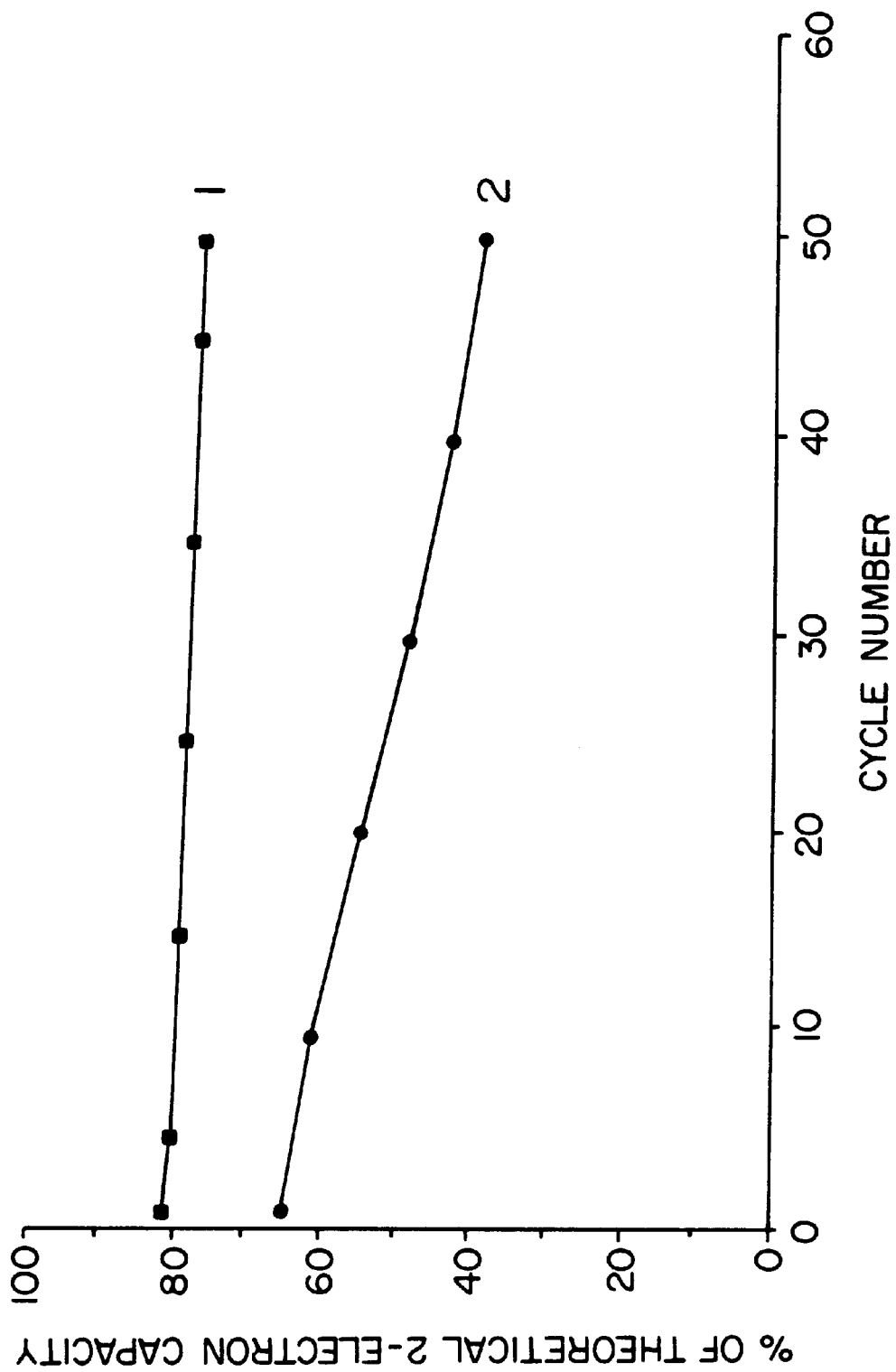
FIG. 4 shows the percentage of two-electron capacity vs. cycle number for a combined chemically modified manganese dioxide/zinc system, (1) with, and (2) without a chemically modified separator.

FIG. 4 shows the percentage of two-electron capacity vs. cycle number for a combined chemically modified manganese dioxide/zinc system, (1) with, and (2) without an ion-selective separator. It is apparent from this figure that after 50 cycles, the coated membrane system shows superior rechargeability over the uncoated membrane.

Figure 2:
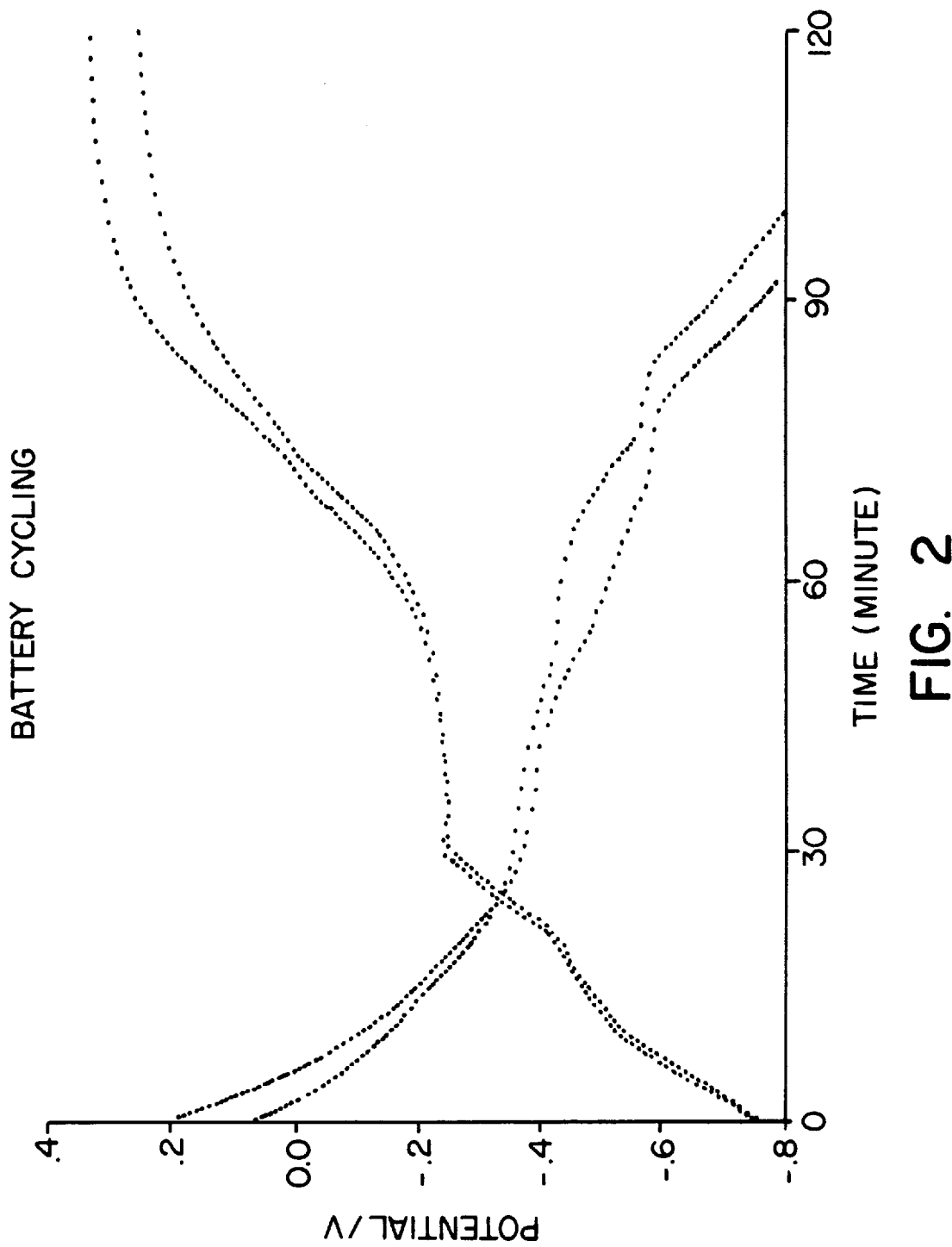
FIG. 2 shows a modified manganese dioxide cathode cycled at 0.4 A/g as a function of discharge time and cycle number.

FIGS. 2–4 show that the results with cells with coated membrane separators have superior capacity and cycle life than those cells with an untreated membrane. The results indicate that the coated Celgard membranes can effectively lead to an improved level of prevention of migration of zincate ions to the cathode. In fact, the membrane not only separates zincate ions from the modified manganese dioxide cathode but also can diminish diffusion of the soluble ionic species away from the cathode during the discharge process. Normally, a cell with starved electrolyte, would be used to minimize escape of soluble species from the electrode matrices. A starved electrolyte is present only in sufficient quantity to wet the electrodes and provide conductivity but in insufficient quantity to dissolve other species, iii) Membrane Coated Electrodes Improved cell performance (zinc anode with a chemically modified manganese dioxide cathode ($CMMnO_2$)) were obtained by coating the active electrode material with SPPO.

Figure 5:
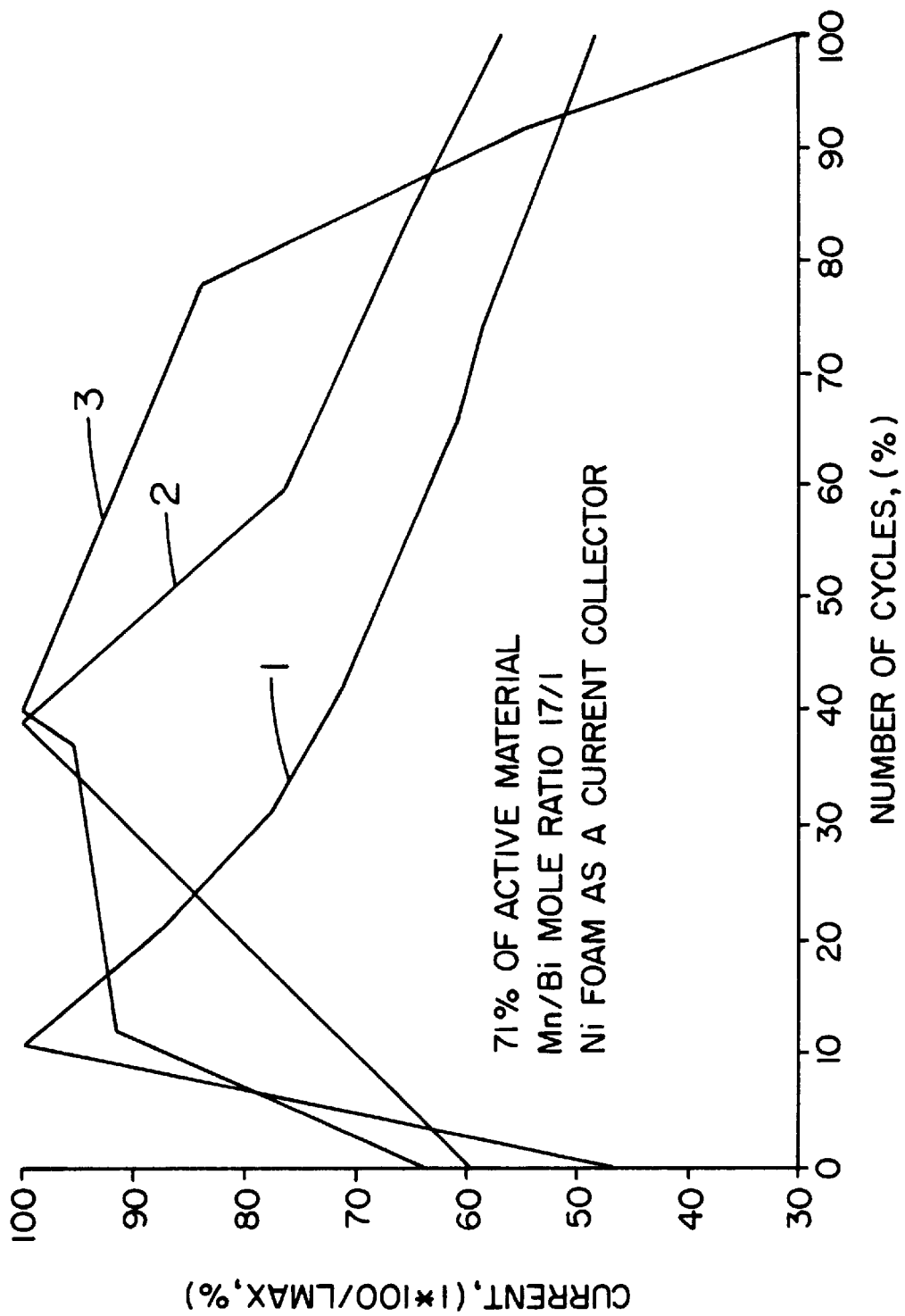
FIG. 5 shows the normalized current vs. percent of cycles for SPPO coated and uncoated electrodes.

FIG. 5 shows the effect of electrodes coated and uncoated with SPPO in maintaining a high capacity over a longer cycle life. Maximum discharge current was measured as a function of cycle life where maximum discharge current provides a measurement of the capacity of the electrode. Chemically modified manganese dioxide electrodes were prepared using 71 wt. % manganese dioxide/bismuth with a Mn/Bi ratio of 17:1 and 29 wt. % carbon/graphite (Ketjen Black). Nickel foam was used as a current collector.

Electrode 1 shows that the normalized peak current for an uncoated electrode occurs at 10% of the total number of cycles (total number of cycles 229). Electrode 3 shows that the normalized peak current for an electrode coated with SPPO alone also occurs at about 40% of the total number of cycles (total number of cycles 264). Electrode 3, however, indicates that the rise to 90% of the maximum current occurs more rapidly and the subsequent fall to less than 80% of the maximum current tapers off more gradually in comparison to Electrode 2 which utilizes extra carbon in the coating. These results clearly indicate the improved capacity of a coated electrode.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

The embodiments of the invention in which an exclusive property or privilege is claimed are defined as follows:

1. An ion-selective electrode, comprising:

an electrode; and a polyaromatic ether coated on said electrode, said polyaromatic ether having the formula

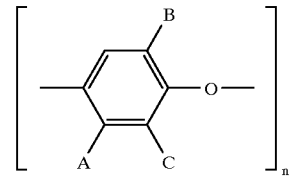

wherein n is a finite integer greater than 0, A is selected from the group consisting of sulfonic acid and carboxylic acid groups and B and C are selected from the group consisting of lower alkyl and phenyl groups, said polyaromatic ether being coated on the electrode to form an ion-selective electrode having an ion-exchange capacity of 1.5–1.9 meq/g and a resistivity less than 1.2Ω/cm².

2. An electrode as claimed in claim 1, wherein the electrode is manganese dioxide or nickel oxide.

3. The ion-selective electrode of claim 1, wherein the polyaromatic ether is sulphonated poly(2,6-dimethyl-1,4-phenylene oxide).

4. The ion-selective electrode of claim 1, wherein the ion-selective electrode has a permeability to zincate ions of 0.045–0.103 mg/cm²h.

* * * * *